United States Patent Office 3,405,990
Patented Oct. 15, 1968

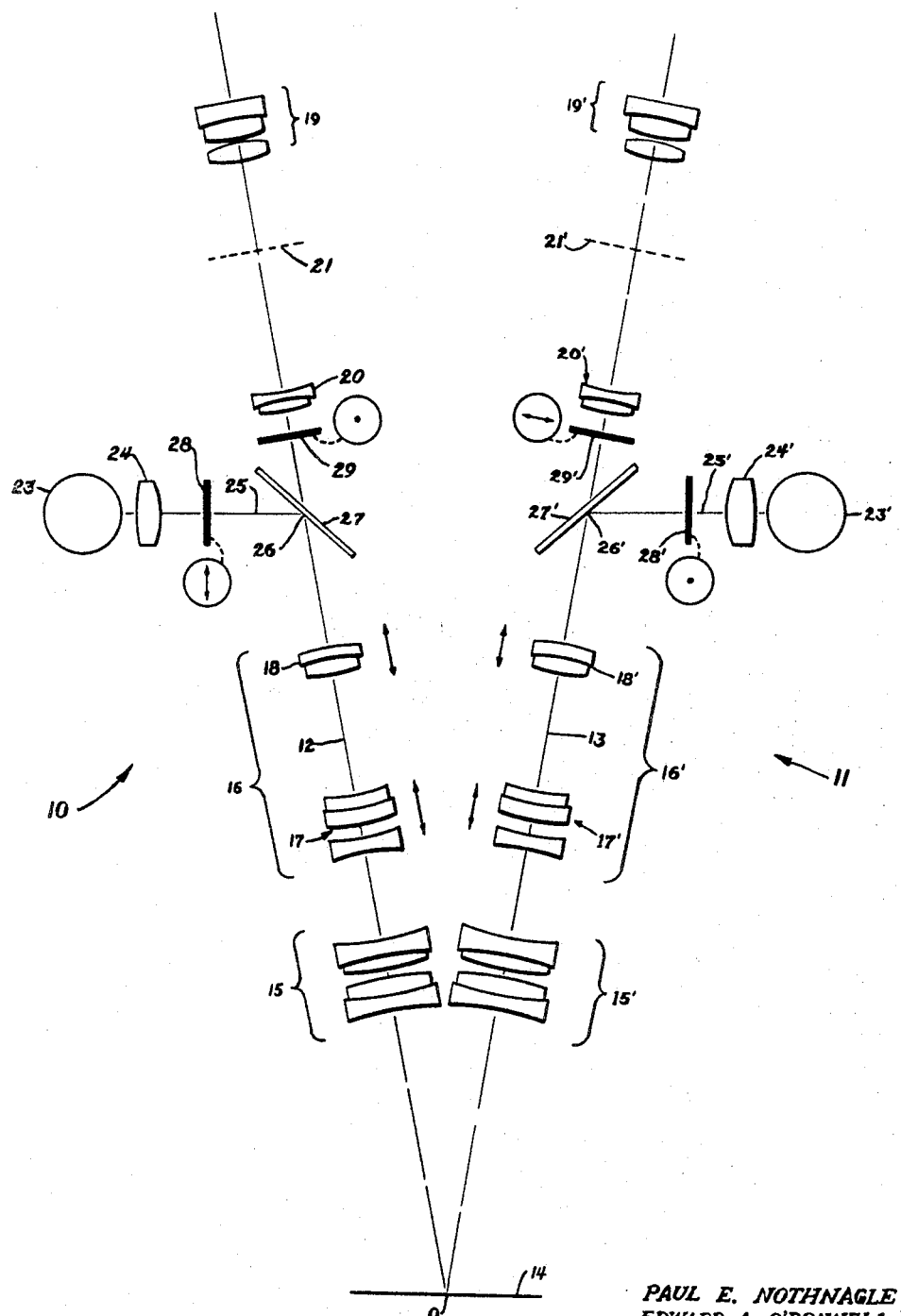

3,405,990
COAXIAL ILLUMINATOR FOR
STEREOMICROSCOPE
Paul E. Nothnagle, Rochester, and Edward A. O'Donnell,
Lakeville, N.Y., assignors to Bausch & Lomb Incorporated, Rochester, N.Y., a corporation of New York
Filed June 25, 1965, Ser. No. 466,900
1 Claim. (Cl. 350—15)

ABSTRACT OF THE DISCLOSURE

Means for eliminating the interior retroreflected bright images of the light filament and stray light from the episcopic illumination of a convergent type stereomicroscope by the use of polarization techniques.

---

The present invention relates to coaxial or episcopic illuminator apparatus for a stereomicroscope and more particularly it relates to improvements therein.

Coaxial illuminators for microscopes in the prior art are usually provided by reflecting the light from a lamp down through the objective upon the specimen by way of a beam divider which is introduced into the microscope tube. In modern microscopes, the air-glass surfaces at least of the objective are coated with antireflection material to reduce the proportion of the reflected light which is reflected by the refractive surfaces of the objective back into the eyepiece. Said reflected light appears as a haze in the field of view and tends to degrade the image contrast, in fact the haze may make the image nearly indistinguishable.

With particular reference to stereomicroscopes of the zoom or variable magnification type involving the use of a multiplicity of lens surfaces, the image contrast becomes so weak that the usefulness of the image is almost nil in spite of the antireflection coatings since some of the light is always reflected from each refractive surface.

It is an object of the present invention to provide a coaxial illuminator for a stereomicroscope by the use of polarization techniques whereby the deleterious light which is retroreflected from the lens surfaces to the eyepiece is cancelled out.

It is a further object to provide such a device which is simple in structure and effective in producing contrast in the image of specimens of the specular kind, the optical parts being intended for certain commercial stereomicroscopes and being comparatively low in cost.

Further objects and advantages will be apparent in the arrangement and combination of the parts of the invention and in the structure thereof, reference being had to the following specification and accompanying drawing for a full disclosure thereof.

In the single figure of the drawing, one form of the invention is illustrated by means of an optical diagram wherein a pair of stereozoom type optical systems are designated generally by numerals 10 and 11. The stereo optical axes of the stereo optical systems 10 and 11 are designated 12 and 13 and converge from top to bottom to a point which is located on the specimen surface 14.

The optical systems 10 and 11 per se are intended to be illustrative of only one of the possible complex optical systems having a large number of refractive lens surfaces, the illustrated systems having ten such air-glass surfaces on the axes 12 and 13 between the beam dividers 27–27' and specimen surface 14.

Comprised in the individual optical systems 10 and 11 are the objective sections 15 and 15' respectively which form an image of the specimen surface 14. Optically aligned therewith are the variable power or zoon lens sections 16 and 16' of the optical systems 10 and 11 respectively, said sections including front lens components 17, and 17' and rear lens components 18, 18' which are moved axially as indicated by the arrows to vary the magnification of said image.

Aligned rearwardly of the zoom sections 16, 16' are the relay lenses 20 and 20' of the optical systems 10 and 11 respectively, which bring the image forming rays to a focus at the image planes 21 and 21' respectively. Rearmost are the eyepieces 19 and 19' by which the images at 21 and 21' are viewed.

According to the present invention, coaxial or episcopic illumination for the specimen surface 14 is provided as above mentioned in both optical systems 10 and 11 coincidentally, the apparatus for this purpose comprising a pair of lamps 23 and 23' and an accompanying pair of condenser lenses 24 and 24'. The axes 25 and 25' of the condenser lenses 24 and 24' respectively are arranged laterally of the stereo axes 12 and 13 and intersect said axes at points 26 and 26' respectively. At said points of intersection, a pair of beam dividers 27 and 27' are positioned inclinedly so that light rays from the lamps are projected downwardly along the stereo axes 12 and 13 to a point 0 on the specimen surface 14.

Of principal importance in the invention, a pair of polarizer members 28 and 28' is provided in alignment on the lateral axes 25 and 25' respectively between the beam dividers 27, 27' and condensers 24, 24'. The axes of polarization of the polarizer members 28, 28' are oriented oppositely to each other as shown by the adjacent symbols in the drawing.

Furthermore, a pair of analyzer members 29 and 29' is provided in alignment with the axes 12 and 13 respectively between the beam dividers 27, 27' and the lenses 20, 20'. The axes of polarization of said analyzer members 29 and 29' are oriented oppositely to each other and their axes are oriented oppositely to the polarizing members 28 and 28' respectively.

With the polarizers and anlyzers being oriented as described, light rays from the lamp 23 are polarized by the polarizing member 28 and are reflected downwardly by the beam divider 27 through the successive lens surfaces of optical system 10 to the specimen surface 14. At surface 14 the polarized light is reflected upwardly along stereo axis 13 through the successive lens surfaces of the optical system 11 to the beam divider 27' where it is partially transmitted to the analyzer 29'. Since the axis of polarization of the analyzer 29' is oriented parallel to the axis of polarization of the polarizer member 28, the light reflected from the specimen surface 14 passes on through and is seen in the eyepiece 19'. However, since light rays coming from the lamp 23' are polarized oppositely, as shown, from those that can pass through the analyzer 29', any of these retrodirected light rays which are reflected upwardly from the many lens surfaces in the lens assemblies 15' and 16' are extinguished by analyzer 29'.

The same phenomena takes place on the opposite side of the stereomicroscope for light which is directed in the opposite sense so that said phenomena is observed in both eyepieces simultaneously. Since the above-mentioned retrodirected light rays, which produce the deleterious haze, are fully eliminated from the field of view of the analyzer members 29, 29', the best obtainable episcopic illumination for the specimen surface 14 is afforded for a stereomicroscope.

In one successful form of the present invention, the lateral illumination axes 25, 25' are caused to intersect by redirecting the beam dividers 26, 26' which results in the advantage of requiring only a single lamp 23 located at said intersection. An illustration of the above-described modification or mode of operation is believed to be unnecessary.

Although only certain features and forms of the present invention have been shown and described in detail, other forms are possible and changes may be made in the arrangement and structure of the parts without departing from the spirit of the invention as defined in the appended claim.

We claim:

1. A coaxial illuminator for a stereomicroscope having a pair of converging optical systems, each of which has a complex objective and an eyepiece optically aligned therewith on a pair of convergent stereo axes which intersects at a point in the specimen plane of the stereomicroscope, said illuminator having in combination:

a lamp located on each of two lateral axes which intersect said stereo axes respectively between said objectives and eyepieces, light condenser means for said lamp on each lateral axis, a polarizer member aligned on each lateral axis between said lamp and said stereo axes, the polarization axis of one polarizer member being of opposite sense to that of the other polarizing member, a pair of beam dividers angularly positioned respectively at the intersection points of the stereo and lateral axes so that polarized light is reflected along one stereo axis toward said specimen plane and be reflected therefrom up the opposite stereo axis, and analyzer means positioned on each of the stereo pair of axes between said beam divider and eyepiece, the polarization axes of said analyzers being opposed to each other and the polarization axis of each analyzer being opposed to the polarization axis of the adjacent polarizer on the same side of the microscope, whereby the light which is polarized by one of said polarizing members is projected along a first stereo axis and is incident on the specimen surface and is reflected therefrom up the second stereo axis and passes to the eyepiece through the analyzer member located on said second stereo axis, but the same polarized light when reflected back toward the eyepiece from the lens surfaces along said first stereo axis is extinguished by the analyzer member located on said first stereo axis.

References Cited

UNITED STATES PATENTS

| | | | |
|---|---|---|---|
| 2,192,295 | 3/1940 | Berek | 350—91 X |
| 2,255,631 | 9/1941 | Schulman | 350—88 X |
| 2,674,156 | 4/1954 | Mahler | 350—132 |
| 3,186,300 | 6/1965 | Littmann | 350—36 X |
| 3,277,782 | 10/1966 | Smith | 350—91 X |

FOREIGN PATENTS

| | | |
|---|---|---|
| 966,063 | 8/1964 | Great Britain. |

DAVID SCHONBERG, *Primary Examiner.*

P. R. MILLER, *Assistant Examiner.*